United States Patent
Pepper et al.

(10) Patent No.: US 6,973,830 B2
(45) Date of Patent: Dec. 13, 2005

(54) TIME-REVERSED PHOTOACOUSTIC SYSTEM AND USES THEREOF

(75) Inventors: David M. Pepper, Malibu, CA (US); Gilmore J. Dunning, Newbury Park, CA (US); David S. Sumida, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 10/966,698

(22) Filed: Oct. 14, 2004

(65) Prior Publication Data

US 2005/0210985 A1    Sep. 29, 2005

Related U.S. Application Data

(62) Division of application No. 10/809,237, filed on Mar. 24, 2004.

(51) Int. Cl.$^7$ .................. G01N 29/06; G01N 29/24
(52) U.S. Cl. .................. 73/602; 73/643; 600/407; 600/439; 600/443
(58) Field of Search .................. 73/597, 598, 599, 73/600, 601, 602, 606, 627, 628, 632, 642, 73/643, 620, 625, 626; 600/407, 439, 443; 601/2

(56) References Cited

U.S. PATENT DOCUMENTS

| | | | |
|---|---|---|---|
| 4,463,608 A * | 8/1984 | Takeuchi et al. | ............... 73/606 |
| 5,092,336 A | 3/1992 | Fink | ...................... 128/660.03 |
| 5,431,053 A * | 7/1995 | Fink | ............................ 73/602 |
| 5,513,532 A * | 5/1996 | Beffy et al. | .................... 73/628 |
| 6,490,469 B2 | 12/2002 | Candy | ......................... 600/407 |
| 6,657,732 B2 | 12/2003 | Pepper et al. | ................ 356/502 |

FOREIGN PATENT DOCUMENTS

GB          2074732 A *  11/1981   ........... G01S 15/89

* cited by examiner

Primary Examiner—Hezron Williams
Assistant Examiner—Rose M. Miller
(74) Attorney, Agent, or Firm—Ladas & Parry LLP

(57) ABSTRACT

A remote mass is excited by a plurality of beams generated sequentially by each one of a plurality of time reversal mirrors, and the surface vibrations of the excited mass are detected by a laser vibrometer in each of the time reversal mirrors. Each vibrometer generates a signal indicative of the surface vibrations which is stored, reversed in time, and applied to modulate the exciter beam impinged onto the mass by the respective time reversal mirror.

20 Claims, 3 Drawing Sheets

TIME-REVERSED PHOTOACOUSTIC SYSTEM AND USES THEREOF

RELATED APPLICATIONS

This patent application is a divisional application of U.S. Ser. No. 10/809,237, filed on Mar. 24, 2004.

BACKGROUND

This application relates to methods and devices for remote internal inspection and ablation/modification of an object disposed within a mass.

Methods for internal inspection of objects are known. Modern approaches typically use sonar methods for probing and/or altering the internal composition of a mass by applying acoustic waves to the mass, measuring the vibrations induced in the excited mass such as by detecting scattered acoustic waves, and modifying subsequently applied acoustic waves in accordance with the scattered waves. For instance, U.S. Pat. No. 5,092,336 to Fink describes a method for focusing acoustic waves on a target in tissue wherein the tissue containing the target is illuminated with an unfocused acoustic beam, echo signals received by an array of electroacoustic transducers are stored, the distribution in time and the shapes of the echo signals are reversed, and the reversed signals are applied to the transducers in the array to illuminate the tissue.

In U.S. Pat. No. 6,490,469 to Candy, the use of time reversed echo signals is expanded to a method for decomposing a plurality of scatterers in tissue by iteratively transmitting a time reversed field into the plurality of scatterers of the medium and performing a sequence of time-reversal iterations to extract contribution of the i-th scatterer of the plurality of scatterers, estimating a weighting coefficient of the i-th scatterer of the plurality of scatterers, and estimating the plurality of scatterers of the medium with the i-th scatterer removed, until a decomposition condition has been satisfied.

These methods and devices, and others like them, have met with practical success and have been applied to a variety of uses. However, they are limited by their use of acoustic transducers for exciting the target and surrounding mass and for applying the reversed signals to the mass, as well as for measuring the vibrations of the excited mass. What is still needed are methods and devices for remotely focusing energy on a mass to locate and/or destroy or otherwise alter targets disposed therein. The present embodiments answer this and other needs.

SUMMARY

In one embodiment disclosed herein, a method comprises selecting a plurality of time reversal mirrors, each time reversal mirror comprising at least an exciter to impinge at least one exciter beam onto a remote mass to excite the mass, an optical probe to impinge at least one optical beam onto a vibrating surface of the excited mass to be reflected thereby, a laser vibrometer to detect at least part of the optical beam reflected by the vibrating surface of the excited mass and configured to generate signals indicative of the surface vibrations, and a modulator to modulate the at least one exciter beam generated by the exciter; disposing the time reversal mirrors in a predetermined array with respect to the remote mass; operating each one of the time reversal mirrors sequentially to excite the mass while operating the rest of the time reversal mirrors to generate signals indicative of the surface vibrations detected by their respective laser vibrometers; providing the signals generated by the time reversal mirrors to at least one processor to store and reverse the signals; and modulating each exciter beam in accordance with the reversed signals.

In another embodiment disclosed herein, a system comprises a plurality of time reversal mirrors disposed in a predetermined array with respect to a remote mass, each time reversal mirror comprising at least an exciter to impinge at least one exciter beam onto the remote mass to excite the mass, an optical probe to impinge at least one optical beam onto a vibrating surface of the excited mass to be reflected thereby, a laser vibrometer to detect at least part of the optical beam reflected by the vibrating surface of the excited mass and configured to generate signals indicative of the surface vibrations, and a modulator to modulate the at least one exciter beam generated by the exciter; a processor configured to operate each one of the time reversal mirrors sequentially to excite the mass while operating the rest of the time reversal mirrors to generate signals indicative of the surface vibrations detected by their respective laser vibrometers, and further configured to store and reverse the signals generated by the time reversal mirrors; and a modulator configured to modulate each exciter beam in accordance with the reversed signals.

These and other features and advantages of this disclosure will become further apparent from the detailed description and accompanying figures that follow. In the figures and description, numerals indicate the various features of the disclosure, like numerals referring to like features throughout both the drawings and the description.

DETAILED DESCRIPTION

Figure 1:
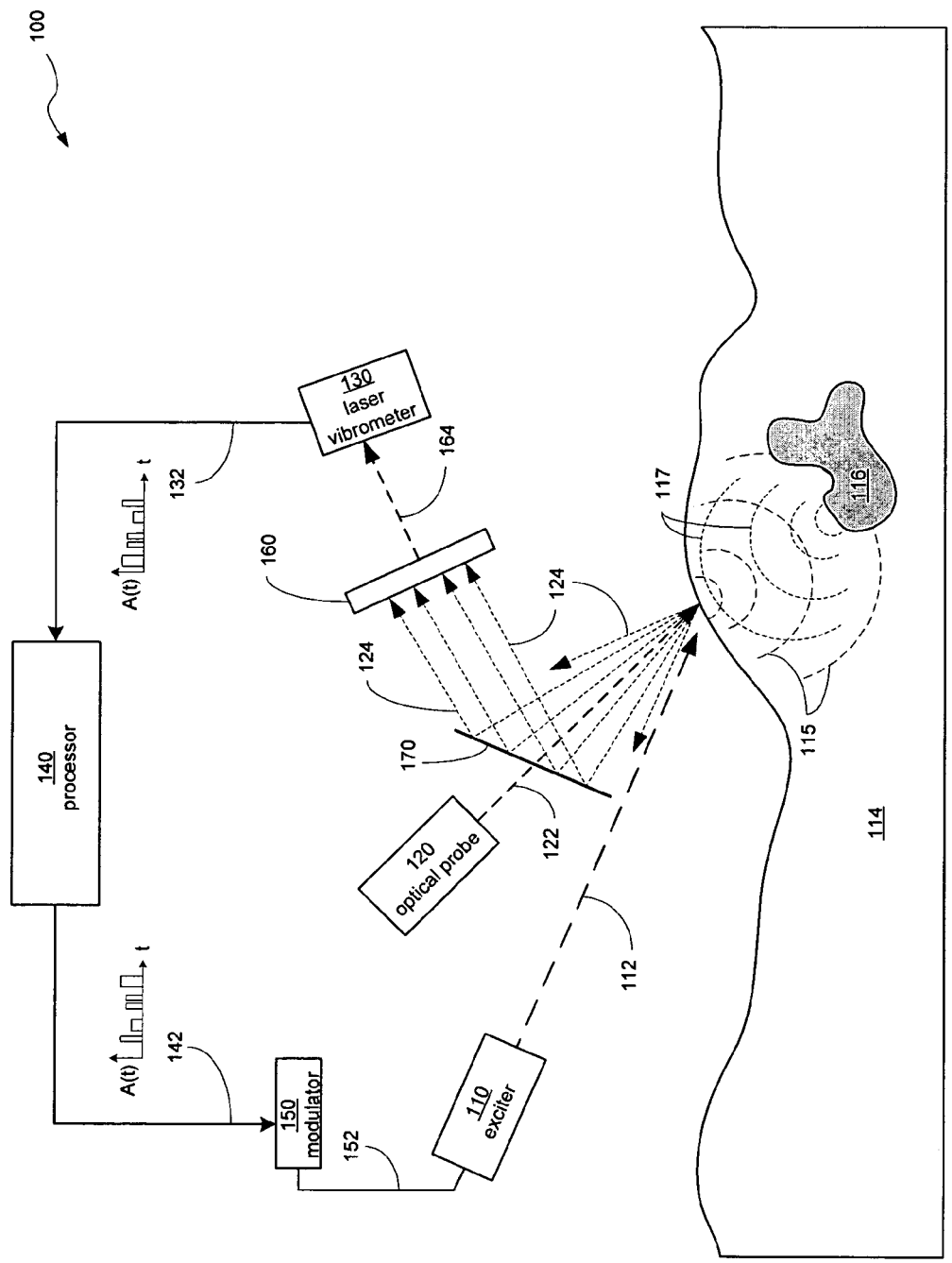
FIG. 1 is a functional diagram of a system as disclosed herein.

Referring to FIG. 1, a system 100 in accordance with an embodiment disclosed herein includes an exciter 110 for emitting one or more exciter beams 112 towards a remotely located mass 114 that has a target 116 disposed therein. The system 100 also includes an optical probe 120 disposed to emit one or more optical beams 122 towards the mass 114. A laser vibrometer 130 is further disposed to detect optical beams reflected by the mass 114 such as speckles 124. The laser vibrometer is connected to a processor 140 to communicate data thereto. The processor is further connected to control a modulator 150 that is configured to modulate the exciter beam(s) 112 generated by the exciter 110.

Figure 2:
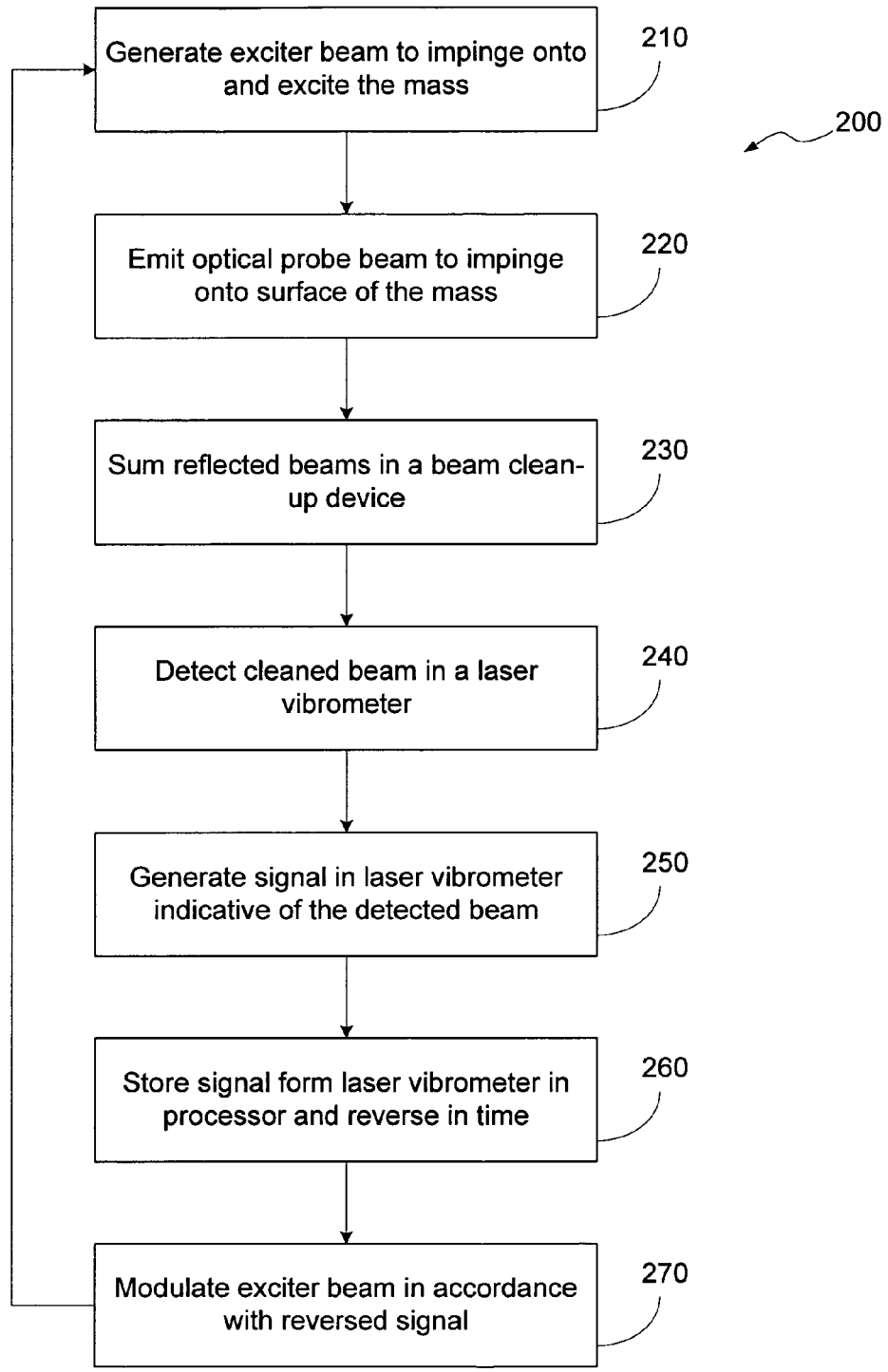
FIG. 2 is a flowchart of a method of use of the system of FIG. 1.

With reference now to FIG. 1 and FIG. 2, in one method of use 200 of system 100, exciter 110 is operated to generate 210 one or more exciter beams 112 to impinge onto the mass 114 and thereby remotely excite the mass. The exciter 110 may comprise any devices known to those skilled in the art or heretofore undeveloped that may remotely excite an object or mass by any mechanism, including but not limited to mechanical, optical, or electrical. Thus, in one embodiment, the exciter 110 may emit 210 one or more acoustic beams 112 to impinge upon the mass 114. In another embodiment, the exciter 110 may include a laser source for generating 210 one or more laser beams 112 to impinge upon the mass 114. Any other device and mechanism of remotely exciting the mass 114 may be used within the spirit and scope of the present disclosure, and is only limited by the requirement that the beam(s) 112 emitted by the exciter 110 must be capable of being amplitude and phase modulated. In a typical embodiment, the exciter 110 may include a pulsed laser source to generate 210 one or more pulsed laser exciter beams 112.

With continued reference to FIGS. 1 and 2, upon impinging onto the mass 114, the exciter beam(s) 112 generates an acoustic impulse 115 that travels through the mass and impinges unto the target 116 disposed therein. The acoustic excitation mechanism that gives rise to the resultant acoustic impulse 115 traveling through the mass 114 is not of importance to the practice of the disclosure (e.g., it may be thermoelastic, ablative, or otherwise). The resultant acoustic impulse 115 thus generated may be either a surface wave (examples of such waves include Rayleigh and Lamb waves), or may be a compressional wave that samples the surface or the volume of the mass 114, respectively. The resultant acoustic impulse 115 traveling through the mass 114 will eventually strike and scatter from the buried target 116. Upon scattering from the buried target 116 or after becoming dispersively spread upon propagation along the surface of the mass 114, the resultant acoustic impulse will cause the surface of the mass (e.g., the ground or the external surfaces of a sample) to vibrate due to the initial pulse 115, harmonics (e.g., due to nonlinearities), and any acoustic echoes 117 from the target 116.

For purposes of discussion only, optical probe 120 is shown disposed above the mass 114 to emit 220 and impinge one or more optical (e.g., laser) beams 122 onto the mass at approximately the same point of impact as the exciter beam(s) 112. The optical probe beam(s) 122 reflect off the surface of the mass 114 as multiple beams 124. Because the surface of the mass 114 is vibrating, the reflected beams 124 will all experience a corresponding Doppler shift. A portion of the reflected beams 124 may be bounced off a reflecting mirror 170 into a beam clean-up optical element 160 to sum 230 the reflected beams into a single optical beam 164 having the same Doppler shift as the reflected beams. A variety of beam clean-up optics are known and available to those skilled in the art, and the particular method or device used within the context of the present disclosure is not important to the scope of the embodiments disclosed herein. It is also expressly noted that certain, currently available laser vibrometers include both the optical probe beam generator (e.g., a laser) as well as the speckle detector and beam clean-up optics into a single, unitary device. The present embodiment separates these elements for ease of discussion and clarity of disclosure.

The single, "cleaned" optical beam 164 is provided to the laser vibrometer 130 to sense or detect 240 the phase shift of the beam and thus the vibrations and/or displacement speed of the surface of the mass 114. A laser vibrometer typically operates on the Doppler principle to compare the wavelength or frequency of the optical probe beam(s) 122 with that of the reflected beams 124, such as by the use of an interferometer. The difference between the two wavelengths or frequencies is indicative of the amplitude and frequency of the surface vibrations under investigation. The laser vibrometer 130 thus generates 250 a signal 132 indicative of the surface vibrations of the mass 114. The signal 132 is in essence a series of pulses in time indicative of the amplitude and frequency of vibration of the surface of the mass 114. It is noted that a compensated vibrometer may be employed as an adaptive photodetection receiver and thus provide any desired beam clean-up. An adaptive photodetector provides phasing of all the detected speckles, thereby enhancing the signal-to-noise (or, equivalently, the surface displacement sensitivity) of the system 100.

The signal 132 generated by the laser vibrometer 130 is provided to a processor 140 for storing and temporal reversing 260. The processor 140 may be equipped with a cache memory to effectively store the signal 132 in a software equivalent of a programmable delay line network. The processor is further programmed to reverse the impulses of the signal 132 in time and thus to output a time-reversed signal 142. Thus, after the entire pulse stream is stored in the cache memory, the delay line then outputs the pulsetrain of the signal 132 in a reverse temporal sequence 142, so that the last feature into the given delay line emerges as the first feature out from the given delay line.

The time-reversed signal 142 is applied to the modulator 150, which is connected to the exciter 110 to modulate 270 the exciter beam(s) 112 emitted thereby in accordance with the time-reversed signal 142. Thus, after initially exciting the mass 114 with an unfocused beam or beams 112, the exciter 110 proceeds to apply time-reversed signals to the same area of the mass 114 as the initial exciter beam. In this manner, the time-reversed signal 142 is a time-reversed acoustic replica of the detected signal 132, and it will be generated into the mass 114 at the same physical location as was the respective received acoustic information 117. As known to those skilled in the art, applying such a time-reversed acoustic replica signal will concentrate energy delivered by the time-reversed signal 142 at the target 116, thereby optimizing the performance and signal-to-noise of the system 100 for mapping the internal structure of the mass 114, or locally modifying and/or ablating the target 116. The process of detecting the vibrations of the surface of the mass 114, reversing the vibration pulses and applying the time-reversed pulse train 112 to the mass can be repeated as many times as desired to achieve the desired result of imaging or modifying/ablating the target 116. As will be appreciated, the combination of the laser vibrometer 130, processor 140, modulator 150 and exciter 110 essentially forms a time reversal mirror for reversing the surface vibrations of the excited mass 114. In a further embodiment, the modulator 150 may modulate the exciter beam(s) 112 with a temporally sampled reversed signal in accordance with the Nyquist sampling theorem.

System 100 and its method of use as outlined above can thus be applied to a wide variety of uses, including but not limited to, detection of buried structures in terrestrial and ocean-based applications (e.g., explosive mines), remotely mapping objects behind opaque media such as buried objects in walls, remote sensing of material attributes, nondestructive evaluation of engines and special coatings, detection and mapping of defects in epoxy bonds, spot welds and other bonds, enhanced sensitivity for composite material evaluation, detection of undesirable defects and inclusions in metallic and ceramic media, medical procedures such as kidney or gall stone ablation and cauterizing, etc. The method and system and for in-situ manufacturing process control applications for improved yield and quality assurance, etc. The target 116 can be an object that is of different composition than the surrounding mass 114, or may be a defect or aberration such as an occlusion or a crack within the mass.

The system 100 may also be formed with a plurality of vibrometers arranged in an array, such as a phased-array receiver configuration, to detect the surface vibrations of the mass 114. In such a configuration, the processor must be equipped with a separate, parallel delay line for each vibrometer to store and time-reverse the signal received from each vibrometer. An equal number of exciters are then each modulated with a respective time-reversed signal to impinge exciter beams onto the mass 114.

Figure 3:
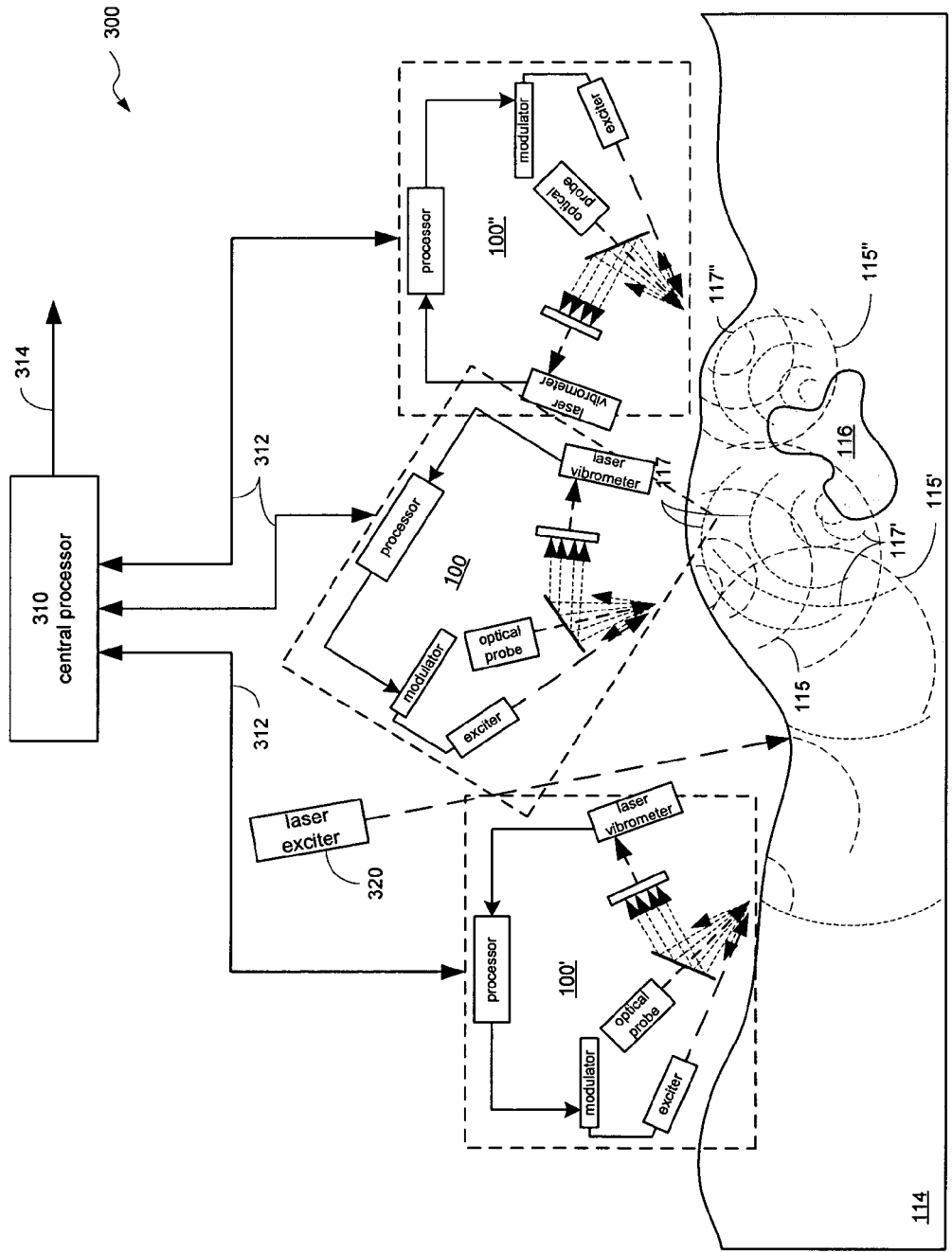
FIG. 3 is a functional diagram of another system as disclosed herein.

With reference now to FIG. 3, another embodiment in accordance with the present disclosure may comprise an array 300 of identical systems or modules 100, 100', 100", . . ., each module assembled as described previously. Such an array 300 can provide enhanced imaging performance by virtue of its ability to address a different location on the surface of the mass 114 to be interrogated, thereby generating and acquiring additional information regarding the size, shape, and acoustic (elastic) properties of the target 116. In addition, an array 300 using multiple modules may detect targets 116 that would otherwise be obscured by other natural (rocks, tree roots, etc.) or man-made objects in the path of the acoustic impulses 115, 115', 115", . . ., generated by the exciter beam(s) of each of the modules 100, 100', 100", . . . .

With continued reference to FIG. 3, each of the modules 100, 100', 100", . . . may be assembled to contain a complete time-reversal subsystem having the capability of probing the surface of the mass 114 at a point (or array of points) using a laser vibrometer and beam clean-up apparatus (to compensate for speckle and relative platform motion, etc), along with a cache memory/processor to store and readout the surface vibration data, and a laser exciter (or array of exciters) to induce acoustic waves into the mass 114 with a beam 122 modulated in accordance with the time-inverted signal 132, all as previously described herein. The system 300 may further contain a central processor 310 transmitting and receiving information 312 to/from each module 100, 100', 100", . . ., including information regarding the surface vibrations detected by each module as well as control data for controlling the operation of each module. The central processor 310 may also provide data 314 regarding the detected target 116 for further analysis and imaging. Furthermore, an auxiliary laser exciter 320 may also be provided for exciting the mass 114.

An array 300 as described above may be operated in several different modes which may be selected based on the nature of the target 116 to be detected relative to the type of mass 114 in which it is immersed (e.g., multiple layered structures with hidden features such as defects in composite materials, embedded undesirable objects, such as rocks under ground, etc.). In one possible mode of operation, the laser exciter of one time-reversal module 100' (or auxiliary module) may be designated as the "master exciter" to induce acoustic impulses 115' in the mass 114 that scatter from the target 116 as acoustic echoes 117' and induce surface vibrations in the mass. The resultant acoustic information detected by the other time-reversed modules 100, 100" then drives the respective excitation lasers (the "slave exciters") of each such module, each exciter beam being modulated by its respective time-reversed signal. All the information may then processed by the central processor 310 for imaging and analysis of the target 116.

In another mode of operation, the laser exciter of each module 100, 100', 100", . . . may act as the master exciter sequentially, to induce acoustic impulses 115, 115', 115" respectively in the mass 114 that scatter from the target 116 as acoustic echoes 117, 117', 117" respectively and induce surface vibrations in the mass. The data from all the modules may be processed centrally by the central processor 310. The central processor 310 may also operate to designate each module sequentially as the master and control the overall process. The order or sequence in which the modules are designated as the master-exciter can be random or predetermined. This mode of operation enables gathering information from the entire ensemble of time-reversal modules and is also more robust because the target 116 is acoustically probed from a plurality of different directions. This mode of operation is theoretically similar to a CAT scan and may be employed with conventional image processing software and algorithms to provide a 3-D reconstruction of the target as well as its elastic properties, which may not be homogeneous or uniform.

We note that as opposed to existing ultrasound imaging array systems (which require direct contact, immersion into water tanks, liquid-spray contact, etc), the present disclosure enables the interrogation to be realized without physical contact to the object under interrogation. In fact, when employing thermoelastic (as opposed to ablative) excitation modes or laser-induced plasmas above the surface, the object can, in principle, be examined without any cosmetic or material damage induced by the laser beams, enabling truly nondestructive testing to be realized. In addition, the laser system enables robust interrogation and excitation to be realized, in that the need for precise alignment of contact transducers to the object (e.g., normal incidence) is relaxed by the laser-based system. That is, a laser beam can be inclined at relatively large angles to the surface under test, and still result in acoustic modes that propagate normal to the surface (as well as surface waves, etc. if needed).

In further embodiments, each time-reversal module 100 may operate its respective exciter 110 and probe 120 at different wavelengths if the two utilize separate laser sources. For purposes of example only, in one embodiment, the wavelength of the laser probe 120 may be chosen to reflect or scatter from the surface of the mass 114 with the greatest optical reflectivity, while the wavelength of the exciter 110 may be chosen to most effectively induce acoustic impulses 115 in the mass using a wavelength with the greatest optical absorption by the mass. In other embodiments, the wavelength of both the laser probe and the exciter can be identical, whereas in other embodiments the same laser source can be used for both probing and exciting the object.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

What is claimed is:

1. A method, comprising:
    selecting a plurality of time reversal mirrors, each time reversal mirror comprising at least an exciter to impinge at least one exciter beam onto a remote mass to excite the mass, an optical probe to impinge at least one optical beam onto a vibrating surface of the excited mass to be reflected thereby, a laser vibrometer to detect at least part of the optical beam reflected by the vibrating surface of the excited mass and configured to generate signals indicative of the surface vibrations, and a modulator to modulate the at least one exciter beam generated by the exciter;
    disposing the time reversal mirrors in a predetermined array with respect to the remote mass;
    operating each one of the time reversal mirrors sequentially to excite the mass while operating the rest of the time reversal mirrors to generate signals indicative of the surface vibrations detected by their respective laser vibrometers;

providing the signals generated by the time reversal mirrors to at least one processor to store and reverse the signals; and modulating each exciter beam in accordance with the reversed signals.

2. The method of claim 1, wherein generating the exciter beams comprises:

generating exciter beams selected from the group comprised of laser beams and acoustic beams.

3. The method of claim 2, wherein providing the signals to the at least one processor comprises:

providing the signals to the at least one processor to store the signals as a series of pulses and to reverse the stored pulses in a first in, last out (FILO) sequence.

4. The method of claim 2, wherein providing the signals to the at least one processor comprises:

providing the signals to the at least one processor to store and reverse the signals in a programmable delay line network.

5. The method of claim 2, wherein generating the exciter beams comprises:

generating pulsed laser beams.

6. The method of claim 2, wherein the laser vibrometer in each of the plurality of time reversal mirrors is a compensated laser vibrometer.

7. The method of claim 6, wherein the laser vibrometer in each of the plurality of time reversal mirrors comprises:

a compensated laser vibrometer comprising an adaptive photodetector for detecting a plurality of speckles from the respective optical beam reflected by the vibrating surface of the excited mass.

8. The method of claim 1, wherein disposing the time reversal mirrors in a predetermined array comprises:

disposing the time reversal mirrors in a phased array.

9. The method of claim 4, wherein providing the signals to the at least one processor comprises:

providing the signals to the at least one processor to store and reverse the signals generated by the vibrometer of each one of the plurality of time reversal mirrors in a respective one of a plurality of programmable delay line networks.

10. A system, comprising:

a plurality of time reversal mirrors disposed in a predetermined array with respect to a remote mass, each time reversal mirror comprising at least an exciter to impinge at least one exciter beam onto the remote mass to excite the mass, an optical probe to impinge at least one optical beam onto a vibrating surface of the excited mass to be reflected thereby, a laser vibrometer to detect at least part of the optical beam reflected by the vibrating surface of the excited mass and configured to generate signals indicative of the surface vibrations, and a modulator to modulate the at least one exciter beam generated by the exciter;

a processor configured to operate each one of the time reversal mirrors sequentially to excite the mass while operating the rest of the time reversal mirrors to generate signals indicative of the surface vibrations detected by their respective laser vibrometers, and further configured to store and reverse the signals generated by the time reversal mirrors; and a modulator configured to modulate each exciter beam in accordance with the reversed signals.

11. The system of claim 10, wherein the exciters are selected from the group of exciters comprised of laser sources configured to impinge at least one laser exciter beam onto the remote mass to excite the mass, and acoustic sources configured to impinge at least one acoustic exciter beam onto the remote mass to excite the mass.

12. The system of claim 11, wherein the processor is configured to store the signals as a series of pulses and to reverse the stored pulses in a first in, last out (FILO) sequence.

13. The system of claim 12, wherein the processor comprises:

a cache memory to store the signals.

14. The system of claim 12, wherein the processor comprises:

a programmable delay line network.

15. The system of claim 14, wherein the processor comprises:

a cache memory to store the signals.

16. The system of claim 11, wherein each exciter is a pulsed laser source for impinging an optical beam onto the remote mass to excite the mass.

17. The system of claim 12, wherein each laser vibrometer is a compensated laser vibrometer.

18. The system of claim 17, wherein each laser vibrometer comprises:

an adaptive photodetector for detecting a plurality of speckles from the respective optical beam reflected by the vibrating surface of the excited mass.

19. The system of claim 10, wherein plurality of time reversal mirrors are disposed in a phased array.

20. The system of claim 14, wherein the processor comprises:

a plurality of programmable delay line networks, each configured to store and reverse the signals generated by the vibrometer of a respective one of the time reversal mirrors.

\* \* \* \* \*